(12) United States Patent
Dombrovski et al.

(10) Patent No.: US 6,441,521 B1
(45) Date of Patent: Aug. 27, 2002

(54) HYBRID SUPERCONDUCTING MOTOR/GENERATOR

(75) Inventors: Viatcheslav V. Dombrovski, Willoughby Hills; David I. Driscoll, South Uclid, both of OH (US); Ira B. Goldberg, Thousand Oaks, CA (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/570,249

(22) Filed: May 12, 2000

(51) Int. Cl.$^7$ ................................................ H02K 55/00
(52) U.S. Cl. .................. 310/156.01; 310/261; 505/876; 505/877
(58) Field of Search ................................. 310/156, 261; 505/905, 879, 876, 877, 878; 335/216; 361/143

(56) References Cited

U.S. PATENT DOCUMENTS

| | | | | |
|---|---|---|---|---|
| 3,763,552 A | * | 10/1973 | Brown et al. | .................. 29/599 |
| 5,668,090 A | | 9/1997 | Kalsi | ........................... 505/166 |
| 5,777,420 A | | 7/1998 | Gamble et al. | ............. 310/261 |
| 6,147,429 A | * | 11/2000 | Akemakou et al. | ......... 310/181 |

FOREIGN PATENT DOCUMENTS

JP        6-165478    *   6/1994           H02K/55/04

* cited by examiner

Primary Examiner—Burton S Mullins
(74) Attorney, Agent, or Firm—Joseph N. Ziebert; Alexander M. Gerasimow; William R. Walbrun

(57) ABSTRACT

A high temperature superconductor (HTS) synchronous motor or generator includes permanent magnets disposed in the rotor. The permanent magnets can be magnetized after the rotor assembly is manufactured. The permanent magnets reduce flux density perpendicular to the superconducting coil. The magnets can be disposed in the d-axis of the motor. The motor is particularly useful in propulsion applications.

21 Claims, 7 Drawing Sheets

HYBRID SUPERCONDUCTING MOTOR/GENERATOR

FIELD OF THE INVENTION

The present invention relates generally to electromotive devices or electromechanical machines, such as, electric generators or electric motors. More particularly, the present invention relates to a rotor design for an electric motor or an electric generator which utilizes a superconducting coil.

BACKGROUND OF THE INVENTION

Electric motor and generator designs can utilize coils comprised of superconductors, such as, high-temperature superconductors (HTS). For example, a conventional superconducting synchronous motor construction can have a stator with multi-phase windings (which can have four poles) and a rotor with four superconducting winding assemblies. The use of superconductors in the winding assemblies allows the motor/generator to obtain superior specific power and increased efficiency. The term motor/generator in this application refers to an electromechanical machine or electromotive device which is a generator, a motor, or both a generator and motor.

The superconducting windings in the rotor significantly reduce winding losses, eddy current losses, and hysteresis losses associated with a conventional motor/generator. For example, superconducting motor constructions may be able to achieve efficiencies exceeding 98% in intermediate size motors. Such motors are particularly useful in applications where smaller size, lighter weight and higher efficiency are important. Motors of this type may be very useful in propulsion system applications where low speed is desirable (e.g., very low speed motors operating at speeds of 120 revolutions per minute (rpm)).

One type of superconducting motor/generator is a high temperature superconducting (HTS) motor/generator. Synchronous, HTS electric motors can be designed to have approximately less than half the volume and half the loss of conventional induction or synchronous, non-superconducting motors.

The magnetic circuits of HTS motors/generators are generally designed and constructed without ferromagnetic rotor assemblies. According to conventional designs, the high strength magnetic fields (large magnetic flux density) would fully saturate a ferromagnetic rotor assembly. Therefore, a ferromagnetic rotor/stator assembly (e.g., core) may not positively affect winding working conditions. In addition, ferromagnetic rotor assemblies, such as, magnetic carbon steel cores can become brittle and magnetic losses increase at the low temperatures associated with superconducting coils (e.g., cryogenic, below 77 K). Accordingly, the use of ferromagnetic rotor assemblies can be problematic in high speed HTS motors/generators.

Conventional superconducting wires or tapes utilized in the coil of the rotor of the motor/generator have a critical current density. Critical current density is dependent upon temperature and upon characteristics of the magnetic field. The largest working current density in the superconducting wire or tape must be smaller than the critical current density.

One characteristic of the magnetic field, the flux density perpendicular to the broad surface of the superconducting tape, has a detrimental effect on the critical current density. Generally, to alleviate this detrimental effect, the form of the cross section of the coil of the superconducting tapes is chosen to make the magnetic flux density perpendicular to the tape surface as small as possible. However, this design criteria can limit the form of the cross section of the tape to be within narrow parameters. This design criteria is particularly stringent in the design of low speed electromotive devices which have a large number of poles.

Relying solely on the superconducting coil (eg., winding) to generate the excitation field requires large current densities. Large current densities in the coil can cause additional direct current losses in the superconducting coil. The large current densities can increase the losses associated with the refrigeration system (e.g., the hot side of the refrigerator) and decrease the efficiency of the motor/generator.

Thus, there is a need for a more efficient superconducting electromechanical machine, such as, a generator or a motor. Further, there is a need for a rotor design which is not subject to disadvantages associated with magnetic flux density perpendicular to the tape surface. Further still, there is a need for an improved design of an HTS motor/generator. Even further, there is a need to decrease the volume of an HTS motor/generator. Even further still, there is a need for an HTS motor/generator having an increased working temperature and decreased losses in the refrigerator. Yet further, there is a need to increase the autonomy of a motor/generator.

SUMMARY OF THE INVENTION

An exemplary embodiment relates to an electromotive device comprising a stator and a rotor. The rotor includes at least one superconducting winding and at least one permanent magnet.

Another exemplary embodiment relates to a rotor assembly for a synchronous electromotive device or electromechanical machine. The rotor assembly includes a superconducting coil and a permanent magnet.

Yet another exemplary embodiment relates to a method of manufacturing a motor. The method includes providing a stator and providing a rotor. The stator has a number of poles, and the rotor has a number of permanent magnets and a superconducting coil. The magnets and coil are attached to a rotor body. The permanent magnets can be magnetized after the superconducting coil and the permanent magnets are attached to the rotor body. The permanent magnets can also be disposed to reduce perpendicular flux density through the superconducting coil. The rotor body can be a magnetic or non-magnetic material.

Yet another exemplary embodiment relates to a motor/generator architecture. The motor/generator architecture includes a rotor. The rotor has a superconducting coil and a permanent magnet.

BRIEF DESCRIPTION OF THE DRAWINGS

An exemplary embodiment will hereinafter be described with reference to the accompanying drawings, wherein like numerals denote like elements and.

DETAILED DESCRIPTION OF THE PREFERRED EMBODIMENTS

Figure 1:
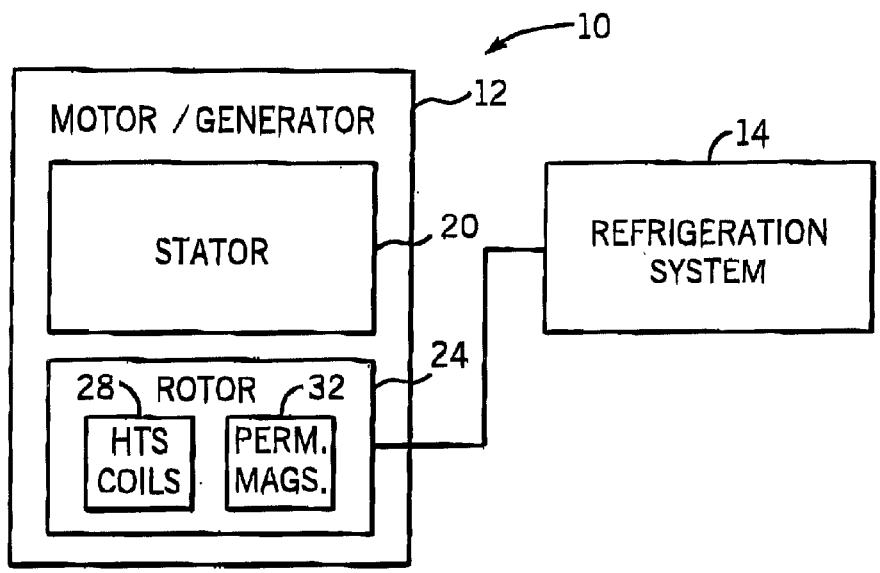
FIG. 1 is a block diagram of an electromotive device including a stator and a rotor having at least one permanent magnet and at least one superconducting coil in accordance with an exemplary embodiment.

With reference to FIG. 1, an electromotive device system, such as, a motor/generator system 10, includes a motor/generator 12 which can be coupled to a refrigeration system 14. Motor/generator 12 includes a stator 20 and a rotor 24. Motor/generator 12 is an electromotive device or electromechanical machine. The design of the system is preferably optimized as an HTS motor/generator system for propulsion systems.

Rotor 24 includes a superconducting coil, such as, one or more superconducting coils 28 and one or more permanent magnets 32. Rotor 24 preferably includes two or more coils 28 and two or more magnets 32 and rotates as part of the operation of motor/generator 12 at a low speed such as 120 rpm. Alternatively, motor/generator 12 can be a high speed device.

Rotor 24 includes a rotor body upon which HTS coil 28 and permanent magnets 32 are attached. The rotor body can be a stainless steel, aluminum, or other non-magnetic material. In another alternative, the rotor body can be a ferromagnetic material. The rotor body is discussed below in more detail with reference to FIG. 2.

Motor/generator 12 is preferably a multi-pole synchronous machine. In the exemplary embodiment of a motor, stator 20 provides a rotating alternating current (AC) field. Rotor 24 generates a direct current (DC) magnetic field (an excitation field) and follows the rotation of the AC field provided by stator 20. In a most preferred exemplary embodiment, motor/generator 12 is a low speed machine having a large number of poles and for use in a propulsion application, such as, a surface ship propulsion system.

Stator 20 can provide the rotating AC electrical field within which rotor 24 rotates in synchronism (in a motor application). In a generator application, stator 20 can be a conventional stator for providing electric power in response to the rotation of rotor 24. Alternatively, stator 20 can be a single or other phase apparatus and can have any number of poles.

Stator 20 can have a number of conductive windings for generating the AC rotating field. The windings can be copper windings. The field rotates in accordance with the principles of a synchronous motor/generator due to the configuration of the copper windings in stator 20 and due to the control of current through the copper windings.

Refrigeration system 14 coupled with rotor 24 can ensure that coil 28 and permanent magnets 32 operate at an appropriate temperature. In an preferred exemplary embodiment, cryogenic temperatures are utilized. For example, rotor 24 can operate at temperatures of 20–40 K. Alternatively, other temperatures may be utilized. For example, advancements in coil 28 technology may allow rotor 24 to operate at higher temperatures (e.g., 77 K).

Permanent magnets 32 and coils 28 of rotor 24 cooperate to generate the DC magnetic field for rotor 24. Magnets 32 provide significant advantages for the design or construction of system 10. For example, magnets 32 allow less superconducting wire which may be costly and or require less current to be utilized in coil 28. The wires associated with coil 28 are expensive and must be cooled by system 14. In addition, the more current provided through coil 28, the greater the cooling load on system 14.

Magnets 32 can also allow motor/generator 12 to operate when coil 28 is not operational. For example, if a fault occurs with respect to coil 28 or if refrigeration system 14 fails, rotor 24 may be able to rotate based upon the magnetic field produced by permanent magnets 32. Thus, magnets 32 can provide a fail safe operational mode for system 10.

In a fault situation, such as, a short circuit on stator 20, the magnetic field of magnets 32 can be shut down by coils 28. The shut down of the field associated with magnets 32 can be achieved by using a reverse current direction in coil 28 (by changing polarity slip rings or by action of a rotating controlled rectifier). In another alternative which uses a flux pump design to provide current to coil 28, the shut down of the field can be achieved by changing the polarity of magnets of the flux pump. This demagnetization process can also be used to demagnetize magnets 32 for repair, disassembly, and assembly purposes.

Permanent magnets 32 can also advantageously serve to reduce flux density perpendicular to the surface of the superconducting tape utilized in coil 28. Magnets 32 can serve to absorb magnetic fields which may otherwise penetrate perpendicular to the tape associated with coils 28. In other words, motor/generator 12 with magnets 32 has a lower flux density perpendicular to the tape surface than the same motor/generator 12 without magnets 32. In this way, flux density perpendicular to the surface of the tapes in coils 28 is decreased. The characteristics of motor/generator 12 with respect to flux density perpendicular to the tape surface is discussed below in more detail with reference to FIGS. 3–9.

Permanent magnets 32 can be manufactured from a number of materials. Magnets 32 can be rare earth metal magnets, such as, samarium cobalt (Sm—Co), praseodymium iron boron (Pr—Fe—B) or certain mixtures of praseodymium and neodymium iron boron (Pr(Nd)—Fe—B). Magnets 32 preferably have a high coercive force (e.g., more than $1 \times 10^6$ A/m) at temperatures near 233 K and significantly more coercive force at temperatures of 77 K (liquid nitrogen boiling point) or below. Alternatively, neodymium iron boron (Nd—Fe—B) magnets can be used at cryogenic temperatures with less effectiveness than the other rare earth metal magnets. Ferrite magnets which have lower coercive force and smaller magnetization can be used with reduced effectiveness. Accordingly, magnets 32 provide a significant increase in magnetomotive force (MMF) without an increase in the size of coils 28. Magnets 32 preferably perform better at colder temperatures provided by refrigeration system 14.

Superconducting coils 28 can be comprised of HTS rotor windings. Preferably, the conductors or tapes associated with coils 28 are arranged in a race track configuration and are made from a high temperature superconducting material. For example, coils 28 can be arranged in single or double pancake configurations including high temperature copper oxide ceramic superconducting material, such as, $Bi_2Sr_2Ca_2Cu_3O_x$, commonly designated BSCCO2223 or YBCO.

Magnets 32 are disposed to increase the used magnetic flux density and to decrease the flux density at locations perpendicular to the surface of tapes of superconducting winding 28. Preferably, magnets 32 are provided as four magnets at four quadrants of rotor 24. In another embodiment, permanent magnet 32 may be multiple magnets. Magnets 32 can also be arranged as sets of magnetic elements and have various forms.

Figure 2:
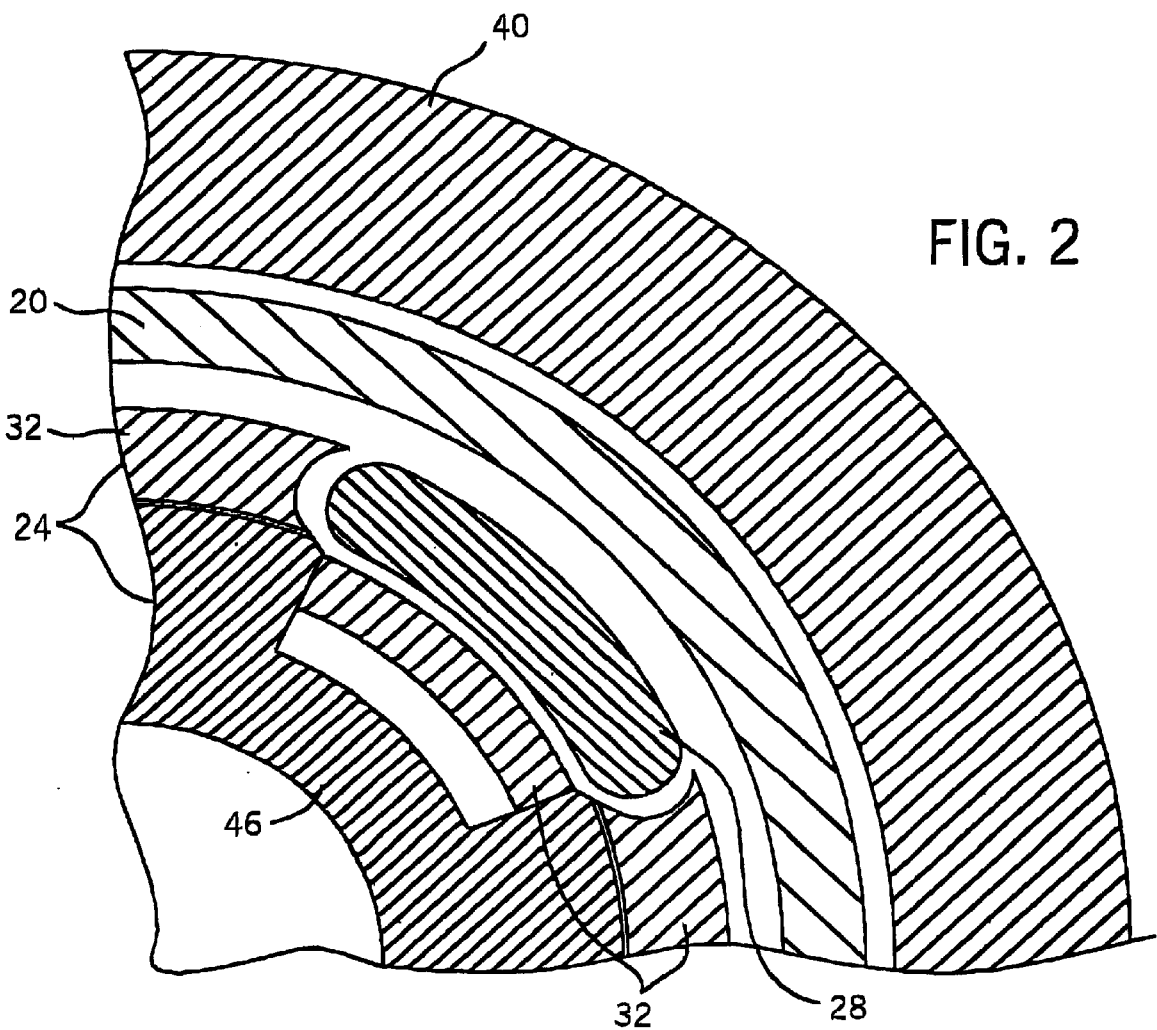
FIG. 2 is a cross sectional view of the electromotive device illustrated in FIG. 1.

With reference to FIG. 2, motor/generator 12 (FIG. 1) includes a cylindrical outer shell or core 40. Core 40 contains stator 20 (stator windings), and rotor 24. Outer core 40 is preferably iron. Rotor 24 is preferably provided in a vacuum jacket which is coupled to refrigeration system 14. Rotor 24 includes an inner core 46, HTS coils 28, and permanent magnets 32.

As shown in FIG. 2, (where a one-quarter portion of a four pole motor/generator is shown), permanent magnets 32 are disposed at quadrature locations on rotor 24. Similarly, four HTS coils 28 are shown at quadrature locations. Permanent magnets 32 and coils 28 are provided around an inner core 46 which can serve as a rotor body or assembly. Inner core 46 can be a non-magnetic or magnetic cylindrical material as discussed above with reference to FIG. 1. Core 46 can be thinner than core 40.

Core 46 is configured to receive coils 24 and magnets 32 at the appropriate locations. Core 46 can be comprised of magnetic material such as steel. Core 46 can also be a non-magnetic air core configuration.

According to natural rules of design for rotor 34, there is available space in the d-axis of the rotor pole for placement of strong permanent magnets 32. The d-axis corresponds to the axis of symmetry for the poles of stator 20. Magnets 32 are preferably disposed in the middle of race-track shaped coils 28. Coils 28 can have 33% to 40% of empty space at their centers.

Rotor 24 is preferably manufactured by providing coils 28 and magnets 32 on core 46. Since magnets 32 can have a coercive force more than 1 million A/m, special equipment for stabilizing magnets can be necessary if magnets 32 are installed after magnetization. To avoid the use of special equipment, magnets 32 can be magnetized after coil 28 and magnets 32 are attached to core 46.

Preferably, magnets 32 are ordered, machined and installed before magnetization. Magnets 32 are magnetized after cooling magnets 32 to a very low temperature during a short period of time. Preferably, the very low temperature is less than the working temperature of rotor 24 and magnets 32 are magnetized by providing a larger current in coils 28 than the working current for rotor 24 to create a magnetomotive force (MMF) strong enough to magnetize magnets 32. Preferably, magnets 32 are magnetized until the limit of their coercive force.

The very low temperature can be 10 K, and the working temperature can be 20–40 K. The working current can be 120 A, and the larger current (e.g., magnetizing current) can be 250 A. After this procedure, coils 28 preferably operate at temperatures and current densities which provide minimum losses both in coil 28 and for refrigeration system 14.

Permanent magnets 32 have best performance in the lowest temperature zones. Accordingly, magnets 32 can be placed in the lowest temperature zone associated with rotor 24. In addition, ferromagnetic material in combination with additional strong permanent magnets 32 can be placed in the direct and quadrature axis of the poles of rotor 24 to increase the used magnetic flux and decrease the flux density perpendicular to the superconducting tape associated with coil 28.

Figure 3:
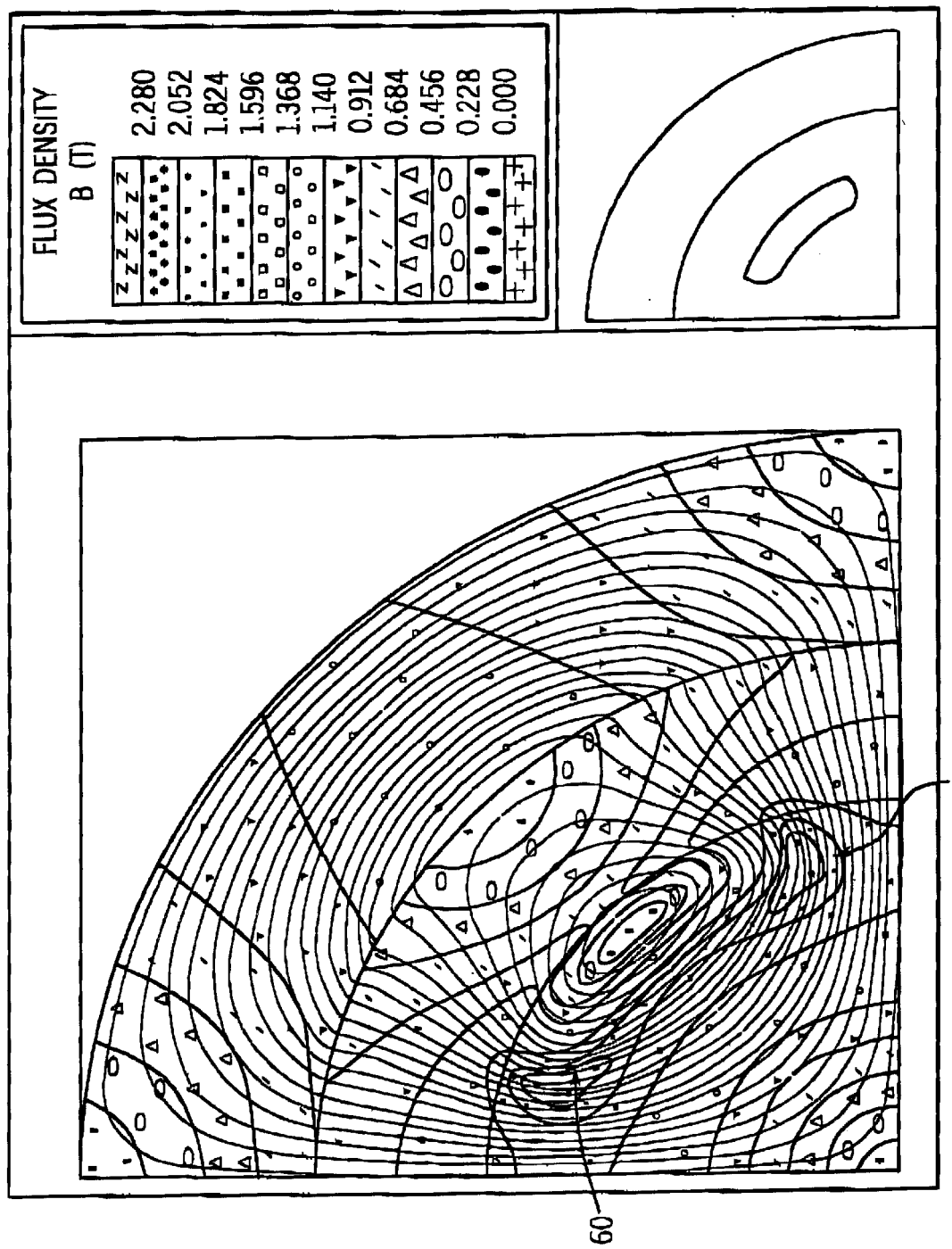
FIG. 3 is a partial view of a field simulation drawing of the electromotive device illustrated in FIG. 1 without the permanent magnet magnetized.

With reference to FIG. 3, a representation of the flux density associated with motor/generator 12 is described. FIG. 3 is also known as a finite element magnetic field map.

Figure 4:
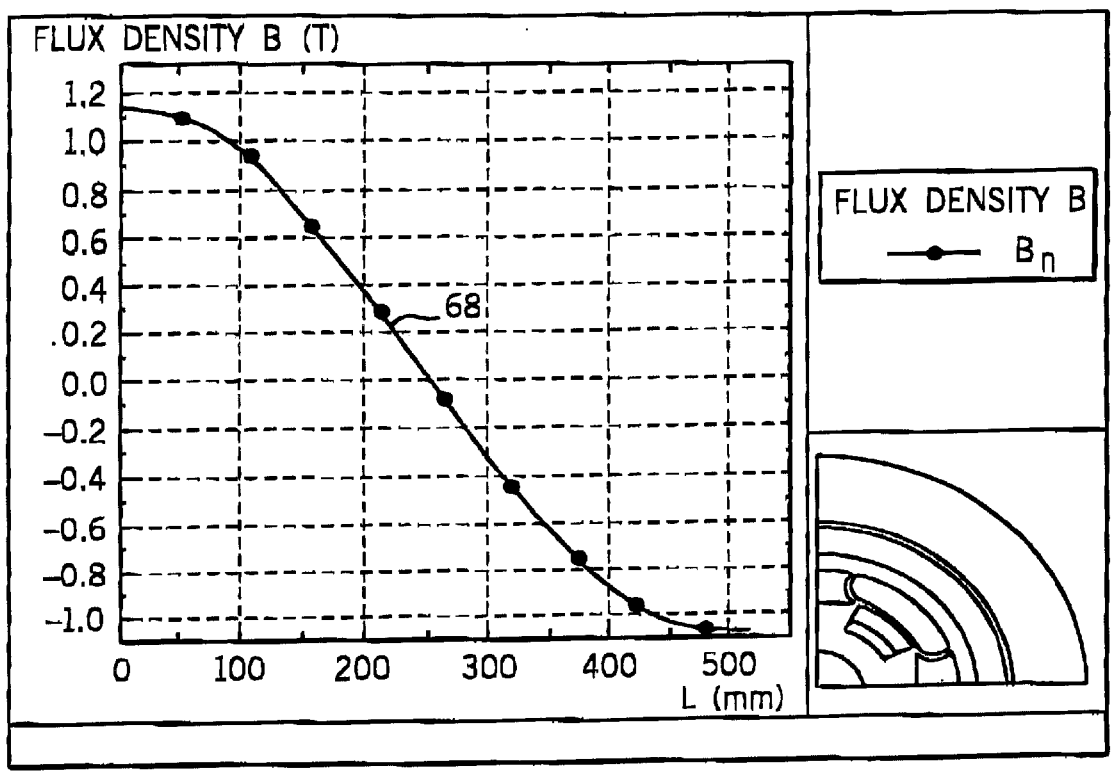
FIG. 4 is a chart showing the flux density within the stator of the electromotive device illustrated in FIG. 1 without the permanent magnet magnetized.
Figure 5:
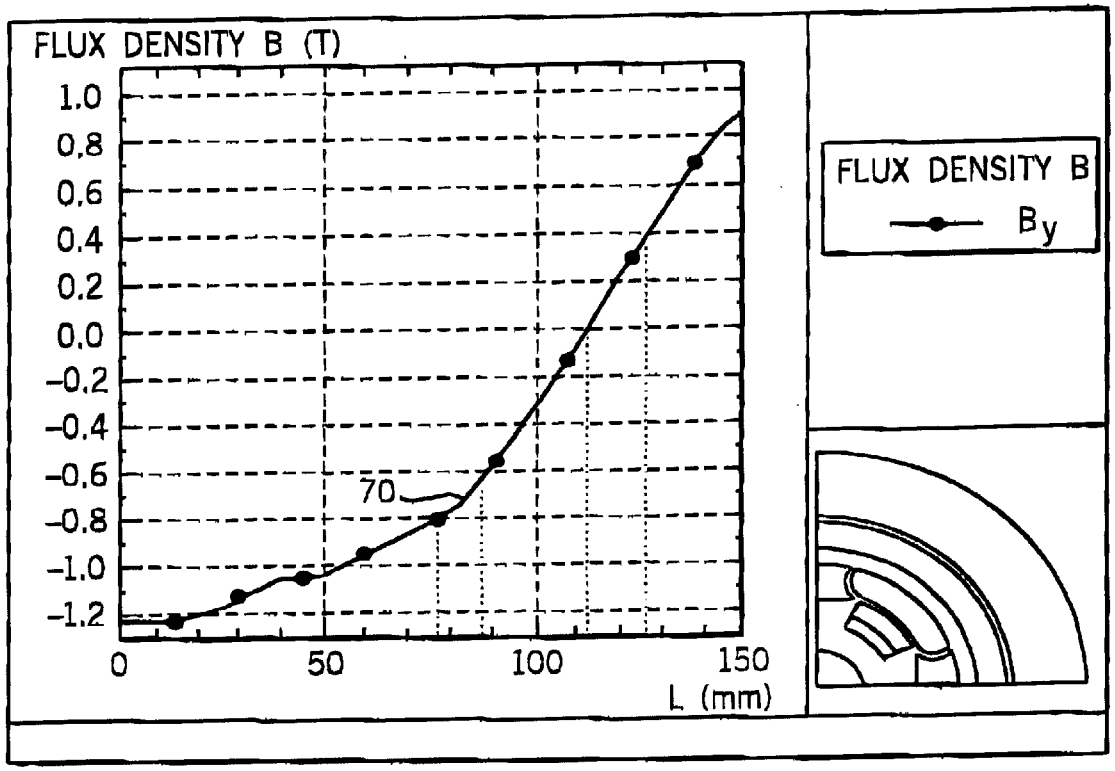
FIG. 5 is a chart showing the flux density perpendicular to the tape surface of the superconducting coil for the electromotive device illustrated in FIG. 1 without the permanent magnet magnetized.
Figure 6:
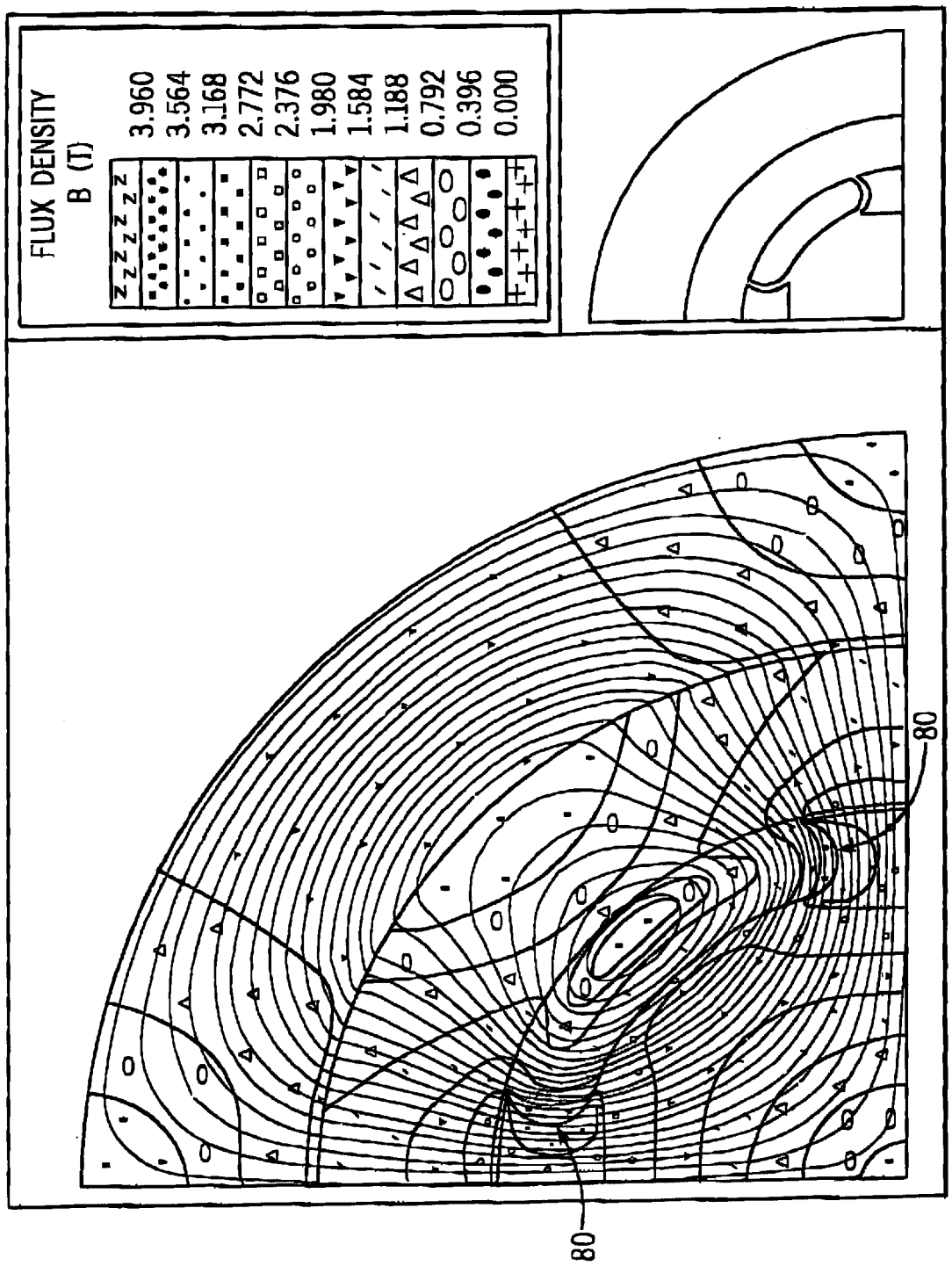
FIG. 6 is a partial view flux density drawing of the electromotive device illustrated in FIG. 1 with the permanent magnet in the d-axis of the rotor magnetized.
Figure 7:
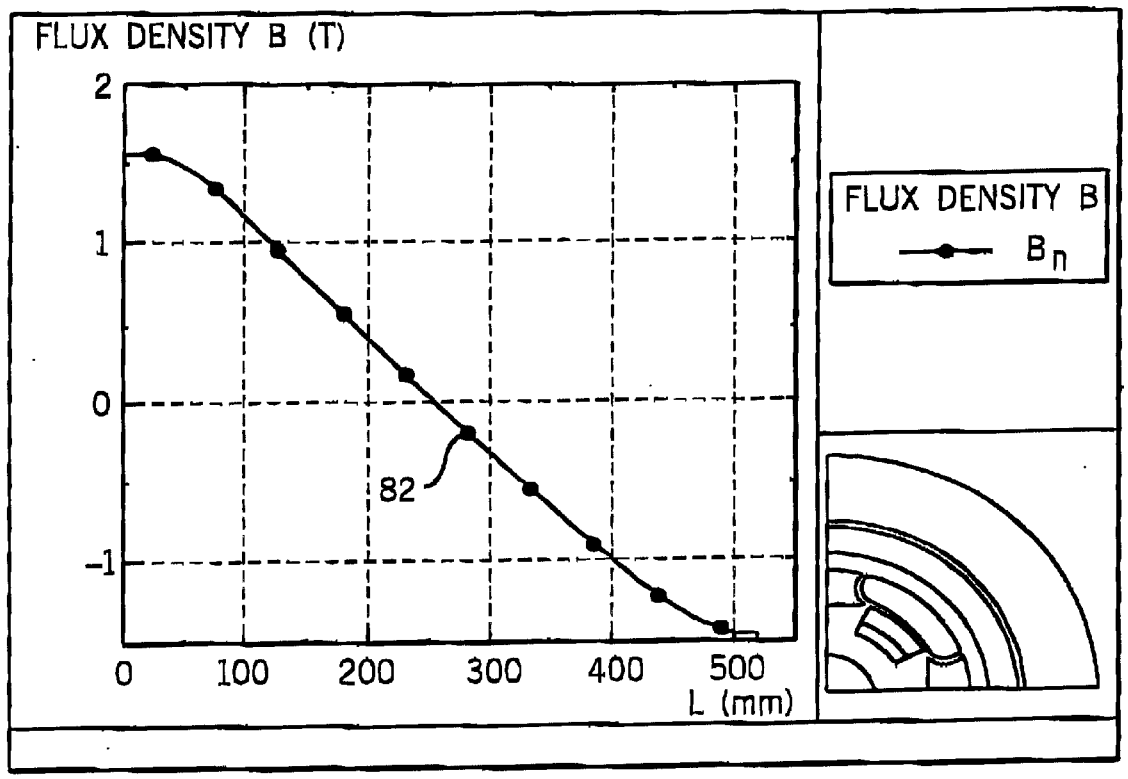
FIG. 7 is a chart showing the flux density within the stator of the electromotive device illustrated in FIG. 1 with the permanent magnet in the d-axis of the rotor magnetized.
Figure 8:
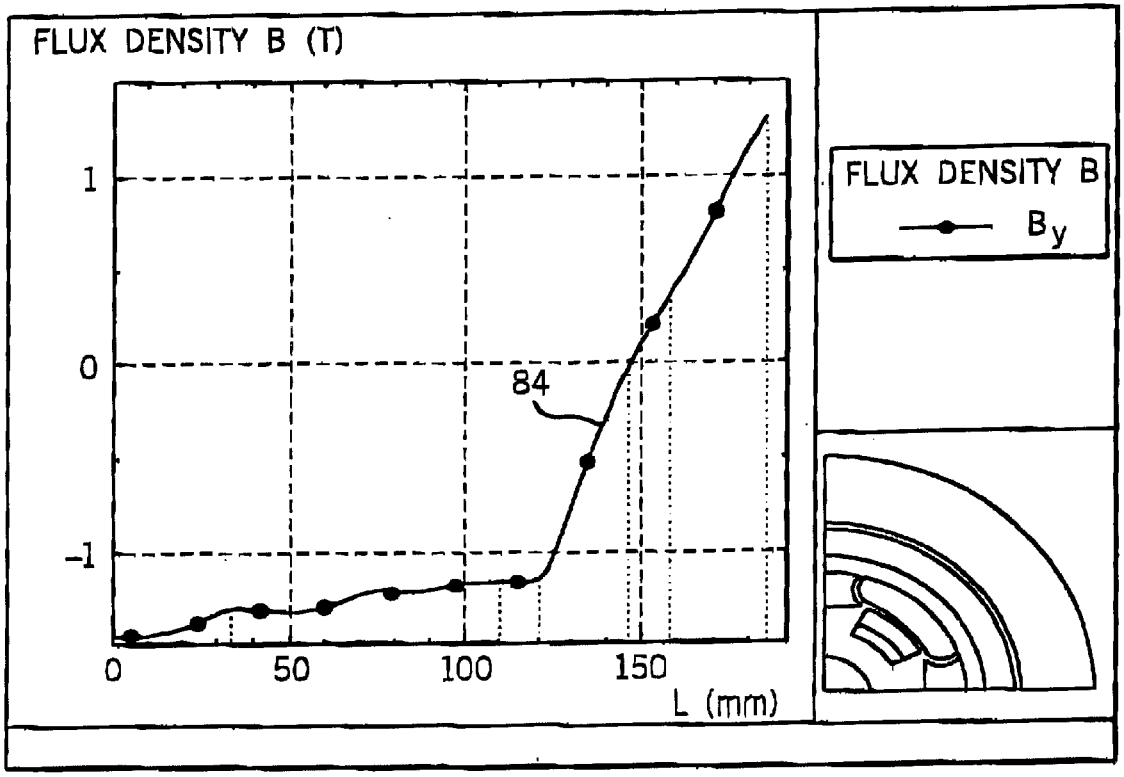
FIG. 8 is a chart showing the flux density perpendicular to the tape surface of the superconducting coil for the electromotive device illustrated in FIG. 1 with the permanent magnet in the d-axis of the rotor magnetized.
Figure 9:
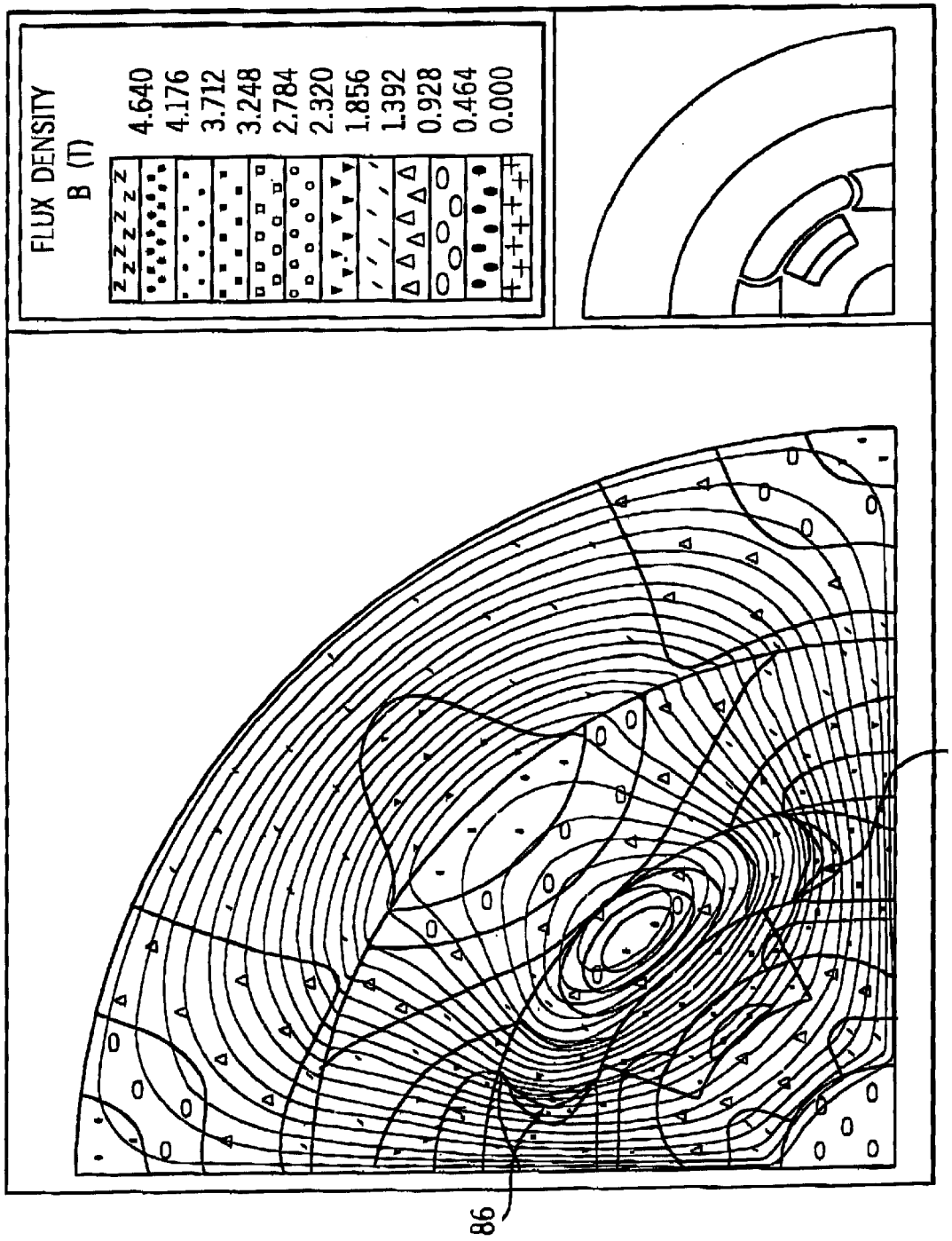
FIG. 9 is a partial view of the flux density drawing of the electromotive device illustrated in FIG. 1 with the permanent magnet in the d-axis of the rotor magnetized, with a magnetic rotor core, and with an additional magnet in the q-axis of the rotor magnetized.
Figure 10:
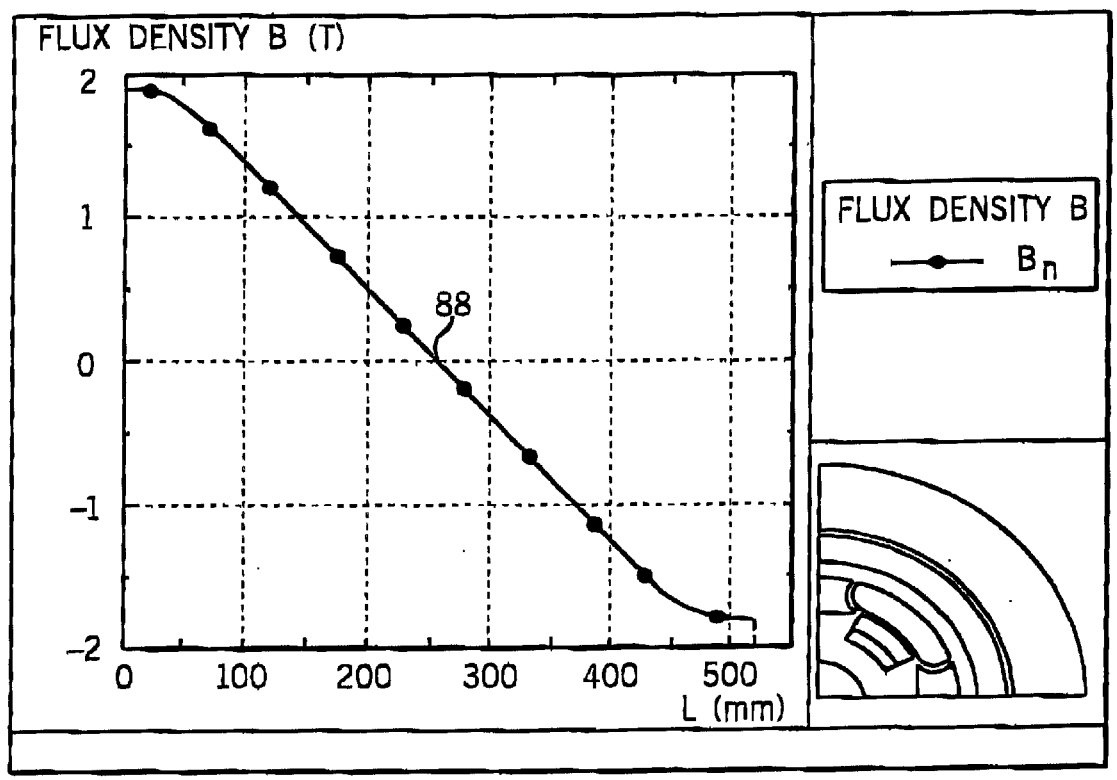
FIG. 10 is a chart showing the flux density within the stator of the electromotive device illustrated in FIG. 1 with the permanent magnet in the d-axis of the rotor magnetized, with a magnetic rotor core, and with an additional magnet in the q-axis of the rotor magnetized.
Figure 11:
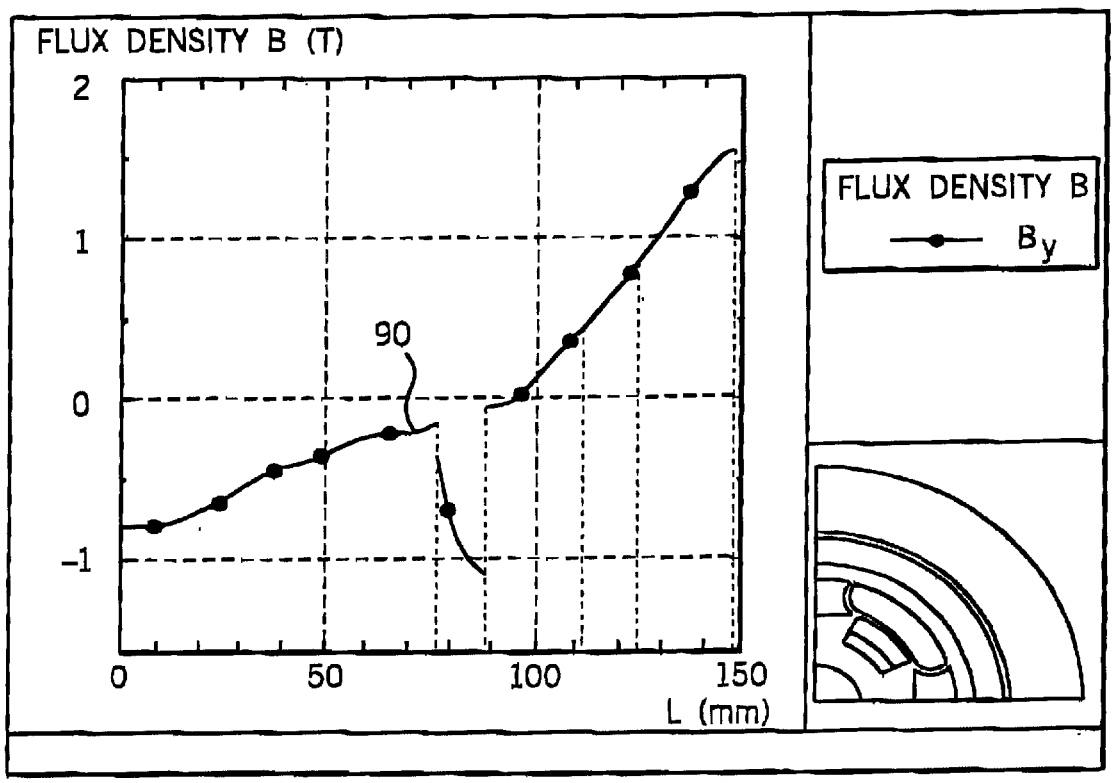
FIG. 11 is a chart showing the flux density perpendicular to the tape surface of the superconducting coil for the electromotive device illustrated in FIG. 1 with the permanent magnet in the d-axis of the rotor magnetized, with a magnetic rotor core, and with an additional magnet in the q-axis of the rotor.

FIGS. 3–5 correspond to the magnetic field characteristics in motor 12 with magnets 32 in a non-magnetized state and with core 46 made of non-magnetic material. FIGS. 6–8 correspond to the magnetic field characteristics in motor/generator 12 with magnets 32 in a magnetized state (in the d-axis of rotor 24) and with core 46 being a non-magnetic material. FIGS. 9–11 correspond to the magnetic field characteristics in motor/generator 12 with magnets 32 in a magnetized state, with core 46 being magnetic and with an additional magnet in the q-axis of rotor 24.

The discussion below with reference to FIGS. 3–11 is provided as an example of the characteristics of motor/generator 12. It is not provided in a limiting fashion, but merely to show certain advantages associated with the use of magnets 32 and the design of motor/generator 12.

In FIG. 3, areas 60 of high flux density 60 are located adjacent coils 28. In particular, flux densities approaching 2.860 Tesla (T) are located in area 60 next to coils 28. The current density through coils 28 is approximately 100 $A/mm^2$.

In FIG. 4, a line 68 represents the flux density distribution along the half pole pitch at a mid-radial location, within the winding of stator 20. The maximum flux density is 1.1 T at the rated current of coil 28.

In FIG. 5, a line 70 represents the perpendicular flux density along a perimeter of the superconducting winding structure, to the tape surface of one of coils 28 when magnets 32 are in a non-magnetized state. Flux density of over -1.2 T is achieved at the same rated current density of 100 $A/mm^2$ (the same as FIG. 4).

In FIG. 6, the flux density in motor/generator 12 is shown with magnets 32 in a magnetized state. Areas 80 of high flux density are not as significant near coils 28 as areas 60 (FIG. 3). These areas are in magnets 32 in the d-axis of rotor 24. When FIGS. 3 and 6 are studied, the ameliorating effects of the magnetization of magnets 32 is apparent by comparing areas 60 and 80. Areas 80 have a significantly reduced region of high flux density (e.g., over 2.77 T) near coils 28.

In FIG. 7, a line 82 represents the flux density at the midradial location of the winding of stator 20 when magnets 32 are magnetized. A flux density of 1.5 T is achieved at the same current density in FIG. 4 (e.g., 100 $A/mm^2$). Therefore, with magnets 32 magnetized, the flux density within stator 20 is significantly greater as can be seen by comparing line 82 of FIG. 7 and line 68 of FIG. 4.

In FIG. 8, a line 84 represents the perpendicular flux density, along a perimeter of the superconducting winding structure, to the tape surface of a coil 28 when magnets 32 are in a magnetized state. FIG. 8 shows that the flux density range is from −1.5 T to under 1.2 T when magnets 32 are magnetized at the same current density as in FIG. 5 (e.g., 100 A/mm$^2$). The maximum flux density perpendicular to the tape is increased relatively less than the useful flux density in stator 20 when magnets 32 are magnetized. Accordingly, superior operation can be achieved in motor/generator 12 when magnets 32 are magnetized.

A similar effect to that described with reference to FIGS. 6–8 is achieved by using a strongly saturated ferromagnetic rotor body (core 46) and at least one additional permanent magnet in the q-axis of rotor 24.

FIG. 9 shows a finite element magnetic field map. Areas 86 of high flux density are not as significant as areas 60 (FIG. 3). FIG. 10 shows the flux density distribution in stator 20 (e.g., a line 88 representing a maximum of 2.0 T), and FIG. 11 shows the magnetic flux density perpendicular to the tape surface of coil 28 (e.g., a line 90 ranging from −1.1 T to 1.6 T).

FIGS. 9–11 are obtained using the same rotor current density utilized for FIGS. 3–8. However, FIGS. 9–11 include a strongly saturated rotor body (core 46), magnets 32 in a magnetized state, and a permanent magnet in the q-axis in a magnetized state. The q-axis is the quadrature axis which corresponds to a direction rotated 90 degrees of electrical angle from the d-axis. The design of FIGS. 9–11 increases the useful flux density by almost 2 times and yet the flux density perpendicular to the tape surface within coil 28 is only increased by 1.41 times in comparison to the design of FIGS. 3–5. Accordingly, the design of FIGS. 9–11 increases the useful magnetic flux density in stator 20 by approximately 1.5 times and yet the maximum flux density perpendicular to the tape in rotor 24 is only increased by 1.2 times in comparison to the design of FIGS. 6–8.

It is understood that, while detailed drawings and specific examples have been given, the details are provided for exemplary purposes only. For example, the particular placement of coils and magnets shown is for illustration only. Further, the current density values and flux measurements are for illustration only. Various changes may be made to the details disclosed without departing from the spirit of the invention which is defined by the following claims.

What is claimed is:

1. An electromotive device, comprising:
   a stator; and
   a rotor, the rotor including at least one superconducting winding and at least one permanent magnet wherein the superconducting winding includes at least one superconducting tape and wherein the superconducting winding is configured to provide a magnetic field having a flux density, wherein the permanent magnet is configured to decrease the flux density on either side of the superconducting winding.

2. The electromotive device of claim 1, wherein the permanent magnet is disposed in a direct axis of a pole on the rotor.

3. The electromotive device of claim 1 further comprising a refrigeration unit for cooling the superconducting winding and the permanent magnet.

4. The electromotive device of claim 3, wherein the superconducting tape is a high temperature superconductor.

5. The electromotive device of claim 3, wherein the permanent magnet includes rare earth and ferrite materials.

6. The electromotive device of claim 1 further comprising an ferromagnetic core.

7. The electromotive device of claim 1, wherein the permanent magnet is disposed to increase used magnetic flux.

8. The electromotive device of claim 7, further comprising another permanent magnet.

9. An electromotive device, comprising: a stator; and
   a rotor, the rotor including at least one superconducting winding and at least one permanent magnet, wherein the permanent magnet is disposed in a direct axis of a pole on the rotor and is disposed to reduce flux density on either side of the super conducting winding.

10. An electromotive device, comprising:
    a stator; and
    a rotor, the rotor including at least one superconducting winding and at least one permanent magnet, wherein the permanent magnet is disposed in a quadrature axis of a pole of the rotor.

11. An electromotive device, comprising:
    a stator; and
    a rotor, the rotor including at least one superconducting winding and at least one permanent magnet, wherein the permanent magnet is magnetized after assembly of the rotor.

12. An electromotive device, comprising:
    a stator; and
    a rotor, the rotor including at least one superconducting winding and at least one permanent magnet, wherein the permanent magnet is magnetized or demagnetized by the superconducting winding.

13. An electromotive device, comprising: a stator; and
    a rotor, the rotor including at least one superconducting winding and at least one permanent magnet, wherein the permanent magnet is disposed in a direct axis of a pole on the rotor, wherein the permanent magnet is magnetized or demagnetized by the superconducting winding.

14. A rotor assembly for a synchronous electromechanical machine, the rotor assembly comprising:
    a superconducting coil; and
    a pair of permanent magnets, wherein the permanent magnets are disposed to increase used magnetic flux and are disposed on a quadrature axis of poles of the rotor assembly.

15. A rotor assembly for a synchronous electromechanical machine, the rotor assembly comprising:
    a superconducting coil; and
    a permanent magnet, wherein the permanent magnet exhibits a high coercive force of more than 1×10$^6$ A/m at temperatures near 233 K or less.

16. A method of manufacturing a rotating electromechanical device, the method comprising:
    providing a stator having a plurality of poles; and
    providing a rotor having a plurality of permanent magnets and a plurality of superconducting coils attached to a rotor body, wherein the providing the rotor step includes magnetizing the permanent magnets after the superconducting coils and the permanent magnets are attached to the rotor body, wherein the permanent magnets are disposed to reduce the flux density on either side of the superconducting coil and wherein the rotor body is a magnetic material.

17. The method of claim 16 wherein the rotor body is a magnetic material.

18. A method of manufacturing a rotating electromechanical device, the method comprising:

provding a stator having a plurality of poles; and providing a rotor having a plurality of permanent magnets and a plurality of superconducting coils attached to a rotor body, wherein the providing the rotor step includes magnetizing the permanent magnets after the superconducting coils and the permanent magnets are attached to the rotor body.

19. A method of manufacturing a rotating electromechanical device, the method comprising:

providing a stator having a plurality of poles; and providing a rotor having a plurality of permanent magnets and a plurality of superconducting coils attached to a rotor body, wherein the permanent magnets are disposed to reduce flux density on either side of the superconducting coil and wherein the rotor body is a magnetic material.

20. A motor/generator architecture comprising a rotor having a superconducting coil and a permanent magnet, wherein the superconducting coil includes at least one superconducting tape having a tape surface, and the permanent magnet is disposed to reduce flux density on either side of the superconducting coil.

21. The motor/generator architecture of claim 20, wherein the permanent magnet is in a quadrature or a direct axis of a pole of the rotor.

* * * * *